June 27, 1939.    B. E. GETCHELL ET AL    2,164,009
ELECTRIC PASTEURIZING APPARATUS
Filed March 22, 1938    3 Sheets-Sheet 3
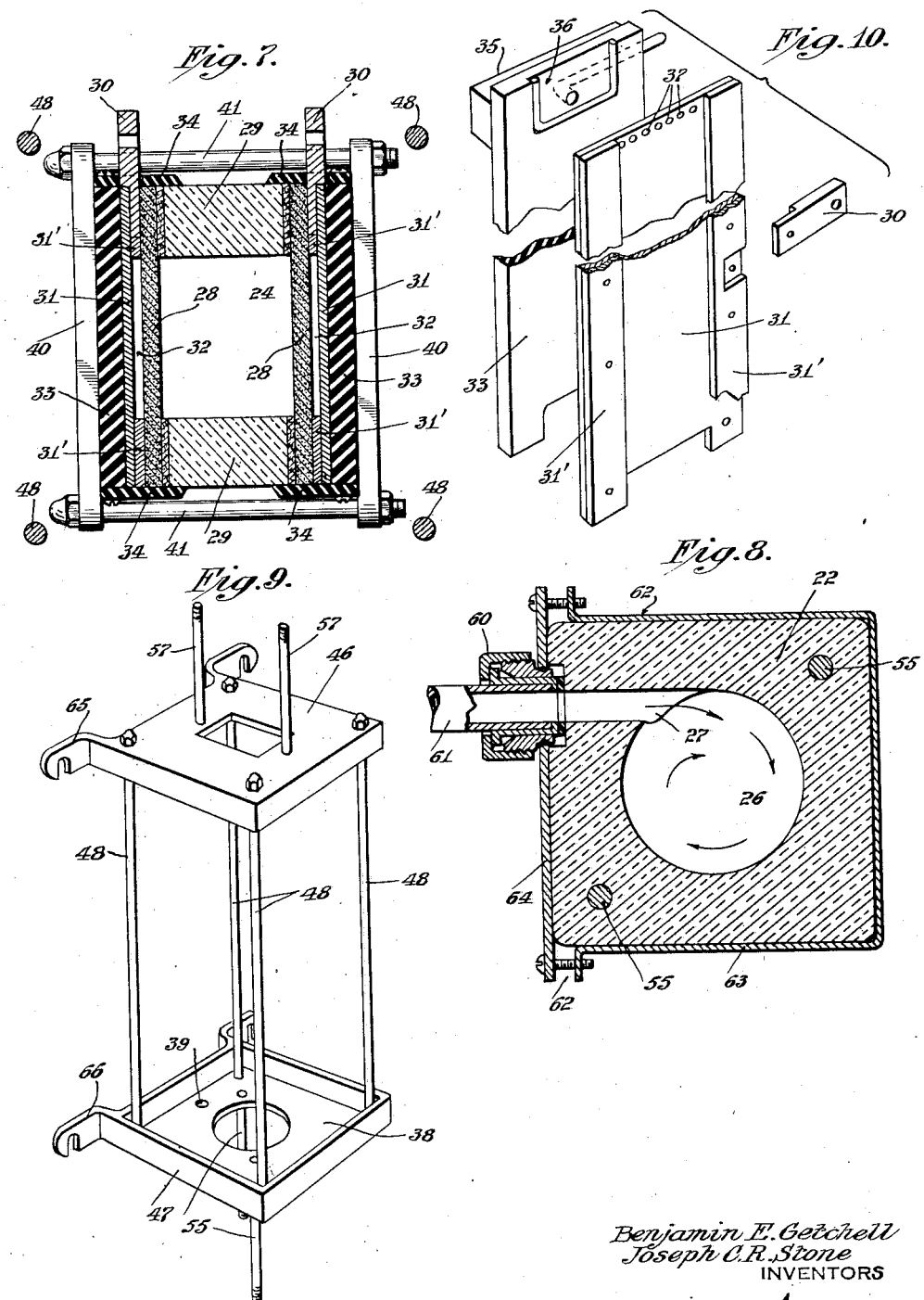
Benjamin E. Getchell
Joseph C. R. Stone
INVENTORS
BY 
ATTORNEY Patented June 27, 1939

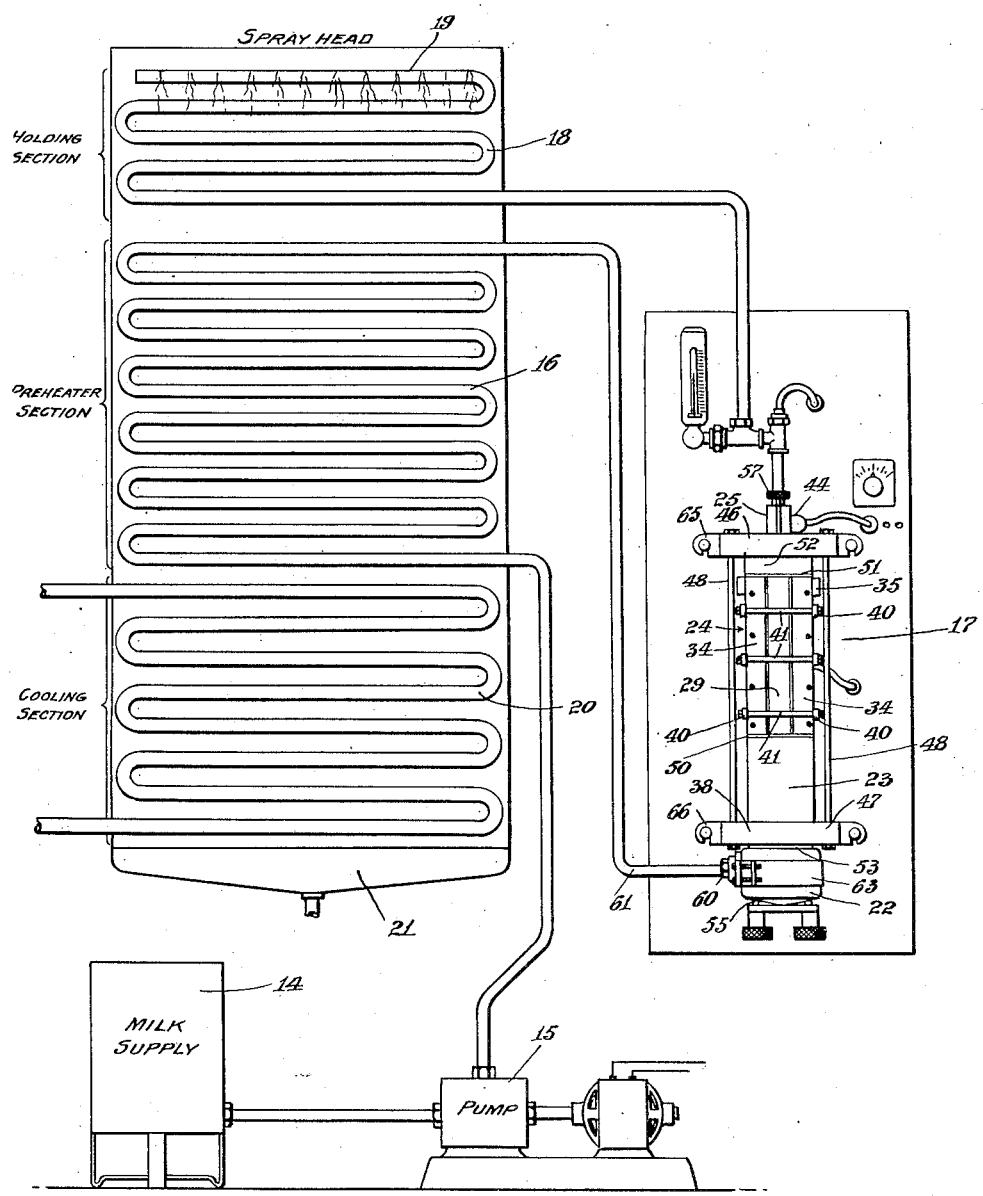

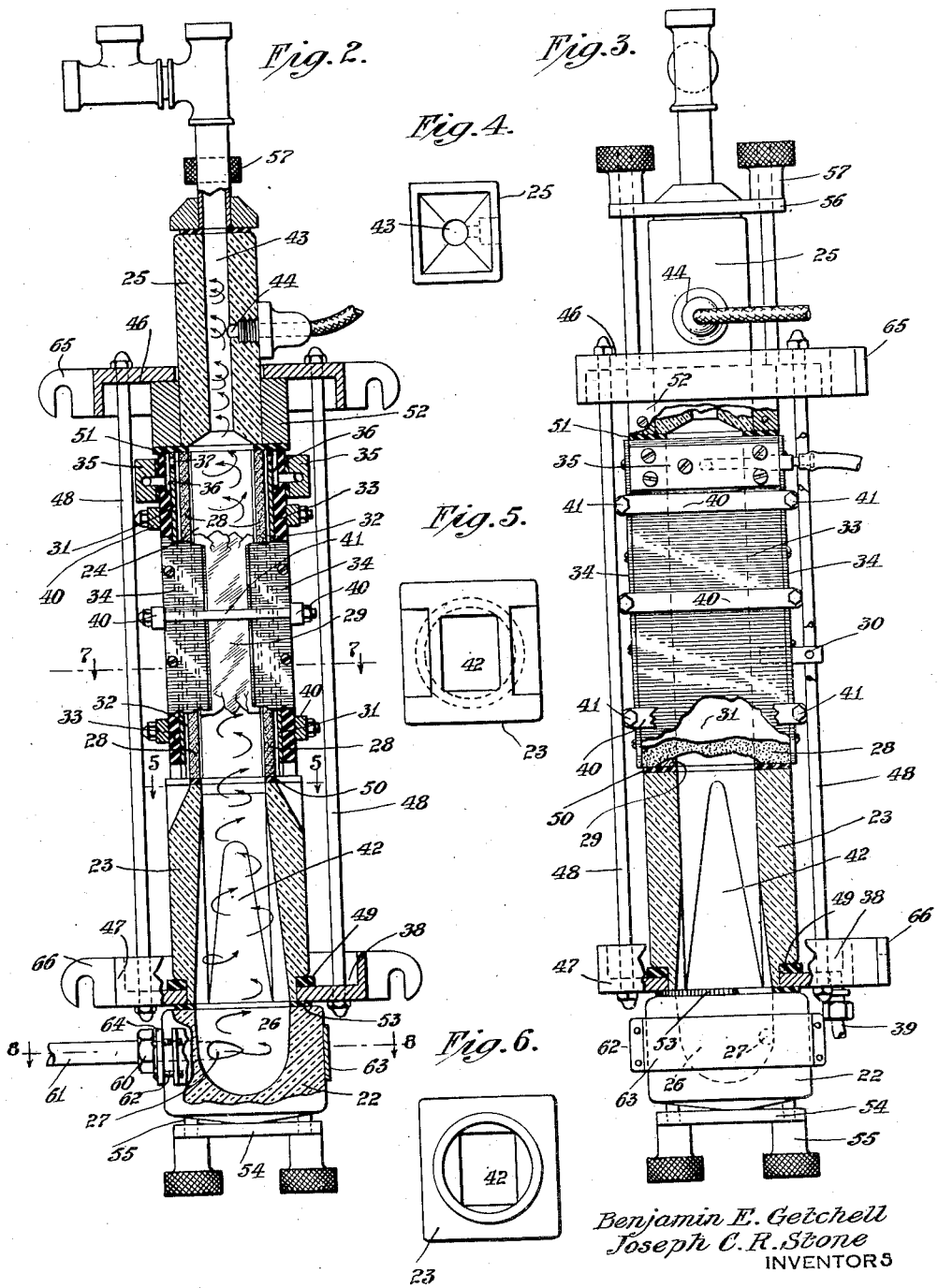

2,164,009

UNITED STATES PATENT OFFICE 2,164,009

ELECTRIC PASTEURIZING APPARATUS

Benjamin E. Getchell, Plainville, Conn., and Joseph C. R. Stone, Belmont, Mass., assignors to The Trumbull Electric Manufacturing Company, Plainville, Conn., a corporation of Connecticut Application March 22, 1938, Serial No. 197,352

6 Claims. (Cl. 219—40)

Our invention relates to milk pasteurizing apparatus and particularly to the heater for a system such as shown and described in the Getchell Patent No. 2,052,396.

In such systems, the liquid milk is forced to flow upwardly through an electrode chamber in which the milk as it passes is heated to a predetermined temperature such as 162° F. by the passage of an alternating electric current. It is of great importance that all of the milk be uniformly heated. This is of especial importance on account of the high temperature reached and the short period allowed for the pasteurizing process. The milk must pass through the electrode chamber continuously and all particles must pass through at the same rate. It is also important to avoid forming or turbulence. There should be no deposit on the electrodes. The best results are obtained by a steady uniform flow through the chamber. It is also of great importance that the parts of the apparatus be readily separable and easily cleaned and sanitary. To attain these results and as nearly as possible ensure perfection in operation, we have designed the construction set forth herein.

We accordingly provide a heating chamber having carbon or other suitable electrodes through which electric current is applied to the milk. These electrodes have copper or other suitable back plates and are kept at a uniform temperature by the passage of water or other cooling medium through channels formed between the central parts of the copper back plates and the carbon members.

The inlet to and the outlet from the electrode chamber are preferably formed of glazed porcelain or other vitreous material and the parts are held together detachably by a clamping frame. The inlet member has a chamber which is cylindrical in horizontal section and has an inlet opening just above the bottom for directing the milk tangentially into the lower end of the heating chamber so that the milk swirls and rises in a helical path which is maintained as the milk flows through the electrode chamber and out at the top. The cross section of the inlet is tapered very gradually from the bottom upwardly to the electrodes. The outlet member passage is preferably cylindrical in cross section to assist in permitting the swirling action to continue and is smaller in cross section so as to speed up the flow of the milk as it leaves the heating chamber. The inlet member has a sort of sump in the bottom to permit the collection of sediment when the milk swirls upwardly. Details of the preferred form of the invention will be understood from the following specification.

Fig. 1 is a front view of apparatus involving our invention in a complete system, parts of which are shown diagrammatically.

Fig. 2 is a front view of the electric heating device with parts shown in vertical section.

Fig. 3 is a side view and partial section of the parts shown in Fig. 2.

Fig. 4 is a view of the lower end of the outlet member of the milk heater or electrode chamber.

Fig. 5 is a plan view of the inlet member for the electrode chamber or heater on the plane of the line 5—5 of Fig. 2.

Fig. 6 is a view of the lower end of the inlet member of Fig. 5.

Fig. 7 is a horizontal cross section of the electrode chamber on the plane of the line 7—7 of Fig. 2.

Fig. 8 is a horizontal cross section of the introductory swirler on the plane of the line 8—8 of Fig. 2.

Fig. 9 is a perspective view of the clamping frame of the electrode chamber.

Fig. 10 is an exploded perspective view of parts of the electrode chamber.

The system is commonly termed a continuous or circulating system as distinguished from the batch type. The liquid from a supply reservoir 14 is forced by a pump 15 through the preheater section 16, the electrode chamber or main heater 17, the holding section 18, the spray head 19 from which it runs down over the holding section, the preheater section and the cooling section 20 to the collector trough 21 whence it passes to the bottling machine or other disposal point (not shown). The temperature of the liquid is regulated in any suitable manner by controlling the electric current supply, the rate of flow of the liquid or by controlling both.

The main heater section where the liquid is heated to the maximum required temperature consists of a swirler base member 22, an inlet member 23, the electrode chamber 24 and the outlet member 25. The members 22, 23 and 25 are preferably of porcelain or other vitreous insulation material with glazed surfaces which do not readily collect deposits and which can be easily cleaned.

The base member 22 has a chamber 26 which is cylindrical in horizontal section at its upper edge and semi-spherical at the bottom. The inlet passage 27 is led in from the side above the bottom so that the liquid stream enters tangentially and thus causes the liquid to swirl and rise in a helical path through the upper members including the electrode chamber. The bottom of the chamber 26 serves as a sump below the inlet for the collection of sediment, if any.

The electrode chamber 24 has carbon, graphite or other suitable plates 28 on opposite sides separated by insulating plates 29 preferably of transparent glass. Electric current is fed to the electrodes from terminals 30, 30 connected to copper plates 31, 31. The edges 31' of each plate are reinforced, thickened or offset where it actually contacts the carbon plate so that a thin passage 32 is left between the active central portions of the electrode and the copper backing for the passage of cooling water. The outsides of the copper backing plates are enclosed by insulating plates 33 and 34 and the cooling water is introduced through block 35 into the chamber 36 and through openings 37. The water flows down the passage 32 and is discharged on the outside of the member 23 into the pan 38, wherence it is drained from outlet 39. The parts of the electrode section are suitably held together by the side bars 40 and bolts 41.

Between the swirler member 22 and the electrode chamber is the inlet member 23 which has an elongated tapered passage 42 which is circular in section at its lower end to register with the upper edge of the swirl chamber 26, and rectangular in section at its upper end to register with the lower end of the electrode chamber. This change of section is brought about as gradually as practical in order to interfere as little as possible with the swirling action produced by the tangential entry of the liquid into the chamber 26.

The outlet member 25 has a passage 43 which is tapered from the electrode chamber and is preferably cylindrical in cross section throughout most of its length so as to facilitate the swirling action of the liquid as it flows upwardly to the spray head. In the side of the outlet member is the auxiliary electrode 44 which may be used in connection with the temperature regulation.

The parts 23 and 24 of the heater are secured together by a clamp frame consisting of top and bottom plates 46 and 47 connected by the rods 48. Resilient washers 49, 50 and 51 of rubber for instance are preferably provided between the various parts. A spacer 52 of insulating material is also provided. A rubber washer 53 is provided between parts 22 and 47. Clamping pieces 54, 55 serve to draw the swirl member 22 against the washer 53 beneath the pan-like plate 47. The outlet member 25 is clamped down by the crosspiece 56 and screws 57. The lower end of 25 is forced to compress the washer 51.

A coupling 60 detachably secures the inlet pipe 61 to a clamp 62 fastened around the swirl member 22. This clamp consists of a strap 63 and an anchorage plate 64 to which the coupling is secured.

The plates 46 and 47 have slotted cross bars 65 and 66 which serve to support the clamp frame and attached parts.

All of these parts are so constructed and arranged that they may be readily assembled or separated and so that they may be readily cleaned.

With this construction it is possible to force the milk or other liquid to be pasteurized upwardly through the heater with a swirling motion which keeps the inner surfaces clean and prevents stagnation at any point. The liquid is therefore heated uniformly to the desired temperature.

We claim:

1. In an electric apparatus for pasteurizing liquid, a heater including a chamber having electrodes, detachable inlet members for said chamber one above the other, a detachable outlet member for said chamber, the upper inlet member having a gradually tapered bore communicating directly with the electrode chamber, and the lower inlet member having an entrance to said inlet member positioned at a tangent to said cylindrical bore whereby the liquid enters the lower inlet member and swirls upwardly through the electrode chamber to the outlet member and a sump beneath said entrance.

2. In electric apparatus for pasteurizing liquid, a heater including an electrode chamber having a central passage for the passage of liquid and an electrode on each of the two opposite sides of said passage, an inlet member detachably connected to the lower end of said chamber and having a central tapered bore, a cup shaped member detachably connected to said inlet member and having a cylindrical hollow portion in communication with said central tapered bore, said hollow portion having an inlet with its point of entrance at a tangent to the interior, a member detachably connected to the other end of said chamber and means for forcing liquid into the lower end of the heater and upwardly through the entire heater with a swirling motion.

3. In electric apparatus for pasteurizing liquid, a heater including an electrode chamber having a central passage for the passage of liquid and an electrode on each of the two opposite sides of said passage, a vitreous tubular member detachably connected to the inlet end of said chamber, the opening in said tubular member being tapered and narrowing toward the central passage of the chamber, a cup shaped member detachably connected to the lower end of said latter tubular member and having its cylindrical hollow portion in communication with said tapered opening, said hollow portion having an inlet with its point of entrance at a tangent, a tubular member detachably connected to the outlet end of the chamber, the opening in said latter tubular member conforming to the size of the passage in the chamber at its point of connection thereto but of reduced size for the remainder of said tubular member to accelerate the speed of flow of the liquid through said latter tubular member and means for forcing liquid upwardly with a swirling action through said electrode chamber in a helical stream.

4. Electric apparatus for pasteurizing liquid comprising an electrode chamber having a central passage, an electrode on each of the two opposite sides of said passage, a metal plate having its edges connected to the back of each electrode, said metal plates being connected to a source of electromotive force, a vitreous tubular member detachably connected to the inlet end of said chamber, the opening in said tubular member being tapered and narrowing toward the central passage of the chamber, a cup shaped member detachably connected to said latter tubular member and having its cylindrical hollow portion in communication with said tapered opening, said hollow portion having an inlet with its point of entrance at one side thereof, and a vitreous tubular outlet member detachably connected to the outlet end of the chamber, the opening in said latter tubular member conforming to the size of the passage in the chamber at its point of connection thereto, each of said metal plates being spaced from an electrode at its central portion to provide a passage for cooling medium.

5. In electric apparatus for pasteurizing liquid, a heater including an electrode chamber leaving a central passage for the liquid between two oppositely disposed electrodes, a detachable inlet member connected to the lower end of the electrode chamber, said inlet member having a cup-shaped interior having an inlet with its point of entrance tangent to the side of the cup-shaped interior to compel a swirling movement to the liquid in its passage upward between the electrodes.

6. In an apparatus for heating liquid, a heater including a vertically extending chamber through which liquid is adapted to flow from bottom to top, vertically extending electrodes acting as a portion of the walls of said chamber, an outlet at the top of the chamber, an inlet connected to the lower end of the chamber with a substantially unobstructed passageway to the chamber, said inlet being cup-shaped, and having an entrance passage tangent to the side of the cup-shaped inlet, whereby liquid entering the inlet is compelled to take a swirling movement upward between the walls of the chamber.

BENJAMIN E. GETCHELL.
JOSEPH C. R. STONE.